May 21, 1946.　　E. H. HANSON ET AL　　2,400,640
STEAK BROILER
Filed March 21, 1944　　2 Sheets-Sheet 1

Inventors
Ernest Howard Hanson
Russell Leo LeBoeuf
Andrew Grierson
By Liverance and
Van Antwerp
Attorneys.

Patented May 21, 1946

2,400,640

UNITED STATES PATENT OFFICE 2,400,640

STEAK BROILER

Ernest H. Hanson, Spring Lake, and Andrew Grierson, Muskegon, Mich., and Russell Leo Le Boeuf, Chicago, Ill.

Application March 21, 1944, Serial No. 527,456

7 Claims. (Cl. 99—391)

This invention relates to the cooking of food materials, for example, the broiling of steaks, though it is to be understood that the construction may also be utilized in toasting bread or in other similar operations where heat is to be applied simultaneously to both sides of the food material.

In the present invention, it is a primary object and purpose to provide a novel construction wherein the material which is to be acted upon at both sides by heat is held in a novel holder or retainer therefor of circular form and which comprises two open work frames or sides between which the steak, bread or the like is clamped, providing a holder circular in outline which, in our invention, is to be entered and located betwee spaced vertically positioned heating elements and rotated about a central horizontal axis so that there is a uniform application of heat to all portions of both sides of the held food material. Further objects of the invention are to provide a unit which may be used individually, or a plurality of them may be located side by side, each serving its function and purpose but all controlled as to the rotation of the circular food holding members by a single rotation means therefor.

In this manner a battery of the units may be installed, as many as may be required at any place where broiling, toasting and the like are to be done, as in a restaurant, and as many of the units as may be needed to supply the customers operated, other units not used being available for operation when needed.

Figure 1:
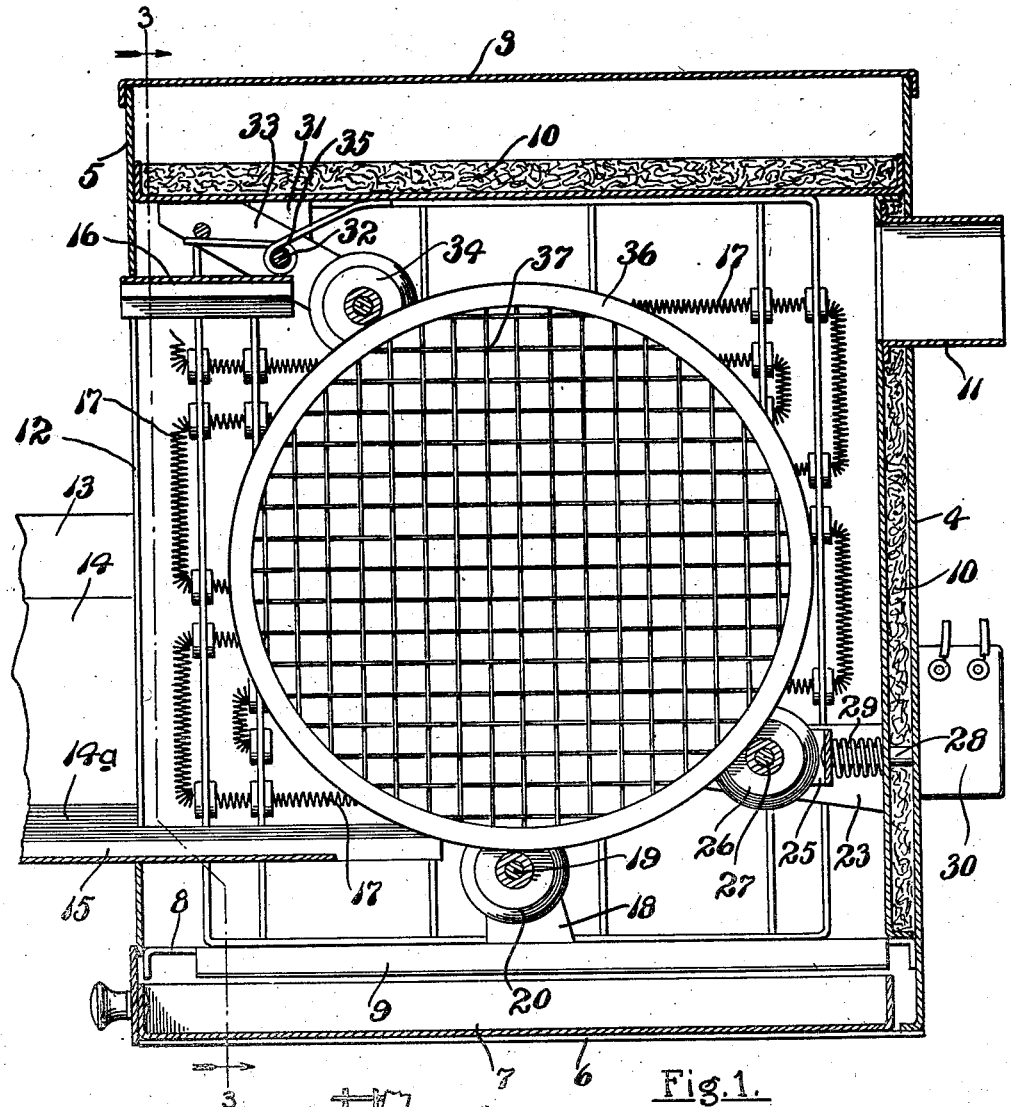
Figure 3:
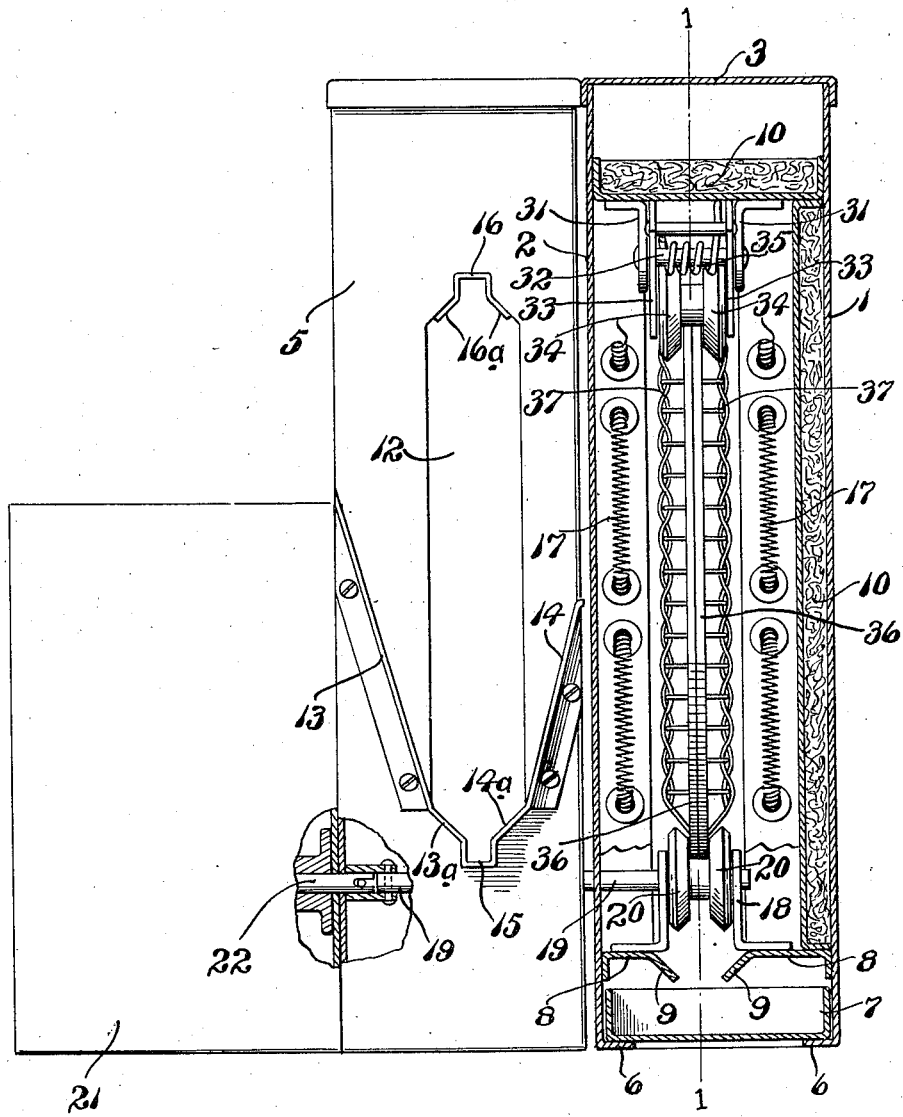

Many other objects and purposes than those stated, with novel constructions for effectively attaining the same, will appear and be understood from the following description taken in connection with the accompanying drawings, in which, Fig. 1 is a vertical section through one of the units substantially on the plane of line 1—1 of Fig. 3 looking to the left.

Figure 2:
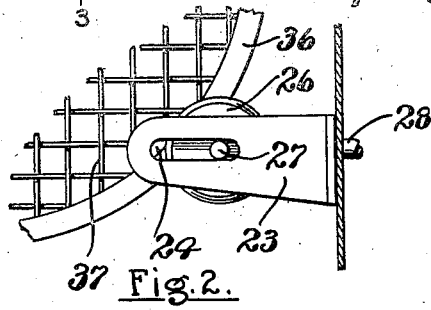

Fig. 2 is a fragmentary elevation illustrating a detail of construction relating to the back supporting and kick-out roller, and Fig. 3 is a vertical transverse section substantially on the plane of line 3—3 of Fig. 1 looking in the direction indicated by the arrows.

Like reference characters refer to like parts in the different figures of the drawings.

In the construction, each of the units comprises an outer housing preferably of sheet metal having spaced vertical sides 1 and 2, a top 3, a back 4 and a front 5 as shown. The lower edge portions of the sides 1 and 2 are turned inwardly to make horizontal flanges 6, and the lower end of the front 5 is cut away making an opening for the inward sliding of a drawer 7 which rests and moves upon the inturned flanges 6. Rearwardly extending plates 8 of sheet metal, at their inner edge portions being turned downwardly and inwardly to make inclined flanges 9, are disposed above the drawer between the back 4 and the lower edge of the front 5 (Figs. 1 and 3). The adjacent edges of the flanges 9 are spaced from each other thereby making a longitudinal slot substantially centrally above the open upper side of the drawer 7. The outer sides 1, top 3 and the back 4 are suitably insulated as shown at 10 to prevent escape of heat and in the upper portion of the back 1 an opening is made with a flue 11 (Fig. 1), for escape of fumes or smoke which may be generated. When a plurality of the units are located side by side, as two of the units are shown in Fig. 3, the inner sides do not require the heat insulation. But in the case of a single unit both sides would be heat insulated like the outer side as shown in Fig. 3.

In the front 5 an elongated vertical entrance opening 12 is made. A guide means for introducing the holder for the steak, bread or the like is secured to the front 5 and extends forwardly therefrom having angularly disposed sides 13 and 14 which, adjacent their lower edges, are bent inwardly at a different angle to each other as shown at 13a and 14a, being integrally connected by a channel shaped guide 15 formed from the same plate of metal as the sides 13 and 14. The guide channel extends through the opening 12 inwardly a distance within the enclosure (Fig. 1). At the upper end of the entrance opening 12 a short guide having an inverted channel 16 with outwardly flared sides 16a is secured. Within each of the units and adjacent each side thereof vertical heating elements, preferably in the form of resistance coils 17, are secured in a suitable manner in spaced parallel relation to each other, and it is between said coils which become heated and their temperature raised when an electric current is passed therethrough, that the food materials to have heat applied at its opposite sides is located in the operation of the apparatus.

Within the lower part of the housing spaced brackets 18 are mounted upon the plates 9 and over the slot above the drawer 7. A horizontal shaft 19 extends through and is mounted on said brackets on which, between the brackets, a wheel is secured having spaced apart flanges 20 and with a continuous annular channel groove between the adjacent sides of the flanges. The shaft 19 is designed to be continuously driven by an electric motor preferably housed within a housing 21 and which, through a suitable reduction speed mechanism, drives a shaft 22 adapted to be coupled to the shaft 19. If a plurality of the units are located side by side, the inner units will each have the shaft 19 extended sufficiently so as to couple with the like shaft 19 in an outer unit and to couple with the shaft 22 whereby all of the wheels having side flanges 20 within the units are simultaneously driven and rotated at a relatively low speed.

At the back of each unit two arms or brackets 23, spaced from each other, are secured and extend forwardly, said arms adjacent their forward ends each having a horizontal slot 24 (Fig. 2). Between said arms 23 a stirrup 25 is located substantially U-shape in form with spaced side arms connected at their rear end by an integral cross portion. A wheel 26 having side flanges identical with the wheel on the shaft 19 is mounted on a shaft 27, the wheel being located between the sides of the stirrup 25 and the ends of the shaft extending through the slots 24 in the arms 23. A rod 28 is connected to the back of the stirrup 25, extends through the back 4 and has a coiled compression spring 29 around it between the stirrup and the back of the unit casing. The rod extends into a kick-out housing 30, the specific construction of which kick-out requires no illustration as it is no part of the present invention and has been used in similar appliances previously. The rod is held in a retracted position with the spring 29 compressed upon moving the roller 26 rearwardly and released automatically at the end of a predetermined time of heat application or flow of current through the heating coil 17. It is to be understood that each of the units will be provided with a rheostat for control of the current through the coil 17 and with a timing mechanism for controlling the time of heat application. But as these are not matters concerned with the present invention and are well known in the art, illustration and description thereof is not made.

At the upper part of each unit, back of the upper end of the entrance opening 12 two spaced depending brackets 31 are secured having a cross shaft 32 extending between them on which spaced arms 33 are pivotally mounted, the shaft passing through the arms between their ends. Between their inner ends a wheel identical with the former wheels, is rotatably mounted on a suitable cross shaft carried by the inner ends of said arms 33, said wheel having spaced side flanges 34. A spring 35 normally turns the arms 33 in a clockwise direction until the free ends thereof are stopped by coming against the upper member of the inner casing over which the heat insulation is located as shown in Fig. 1, this bringing the wheel at 34 into the path of movement of the holder or container for the food materials, such as steak, bread or the like, when it is introduced within the unit by passage through the entrance opening at 12.

The holder for the food comprises two sides each having an annular circular rim 36, preferably of sheet metal, with an open grille 37 of wire within said rim and secured permanently thereto. The circular rims 36 have radial flanges and peripheral flanges at right angles to each other so that when two of the holding members are brought together a continuous channel shaped rim is made adapted to be received between the adjacent vertical faces of the flanges 20, 26 and 34 of the three wheels previously described. Said flanges hold the rims together and against separation while between the open work grilles the material which is to have heat applied thereto is clamped.

As an example steak of the proper thickness may be clamped between the two grille-like holder members and the completed holders with the steak between them rolled along the channel at 15 of the lower entrance guide and upon reaching the upper entrance guide, will also be guided by the channel at 16 until the roller at 34 is reached whereupon said roller will be lifted against the yielding resistance of the spring 35 until the uppermost points of the surrounding rim has passed said roller whereupon it will be lowered and the force of spring 35 aid in pushing the food holder and its contents inwardly into the unit so as to be located at its lower portion between flanges 20 of the lower roller and the flanges 26 of the rear roller. Also the rear roller will be forced toward the back of the unit until the rod 28 is engaged and held by the latch within the kick-out mounted at 30.

With this construction of holder for the food material, such as steak or the like, rotating at the predetermined speed which the design of the unit has fixed and turning about a horizontal axis so as to continually change the position of the outer faces of the food material there results a uniformity of heat application to the surfaces of the food held between the open grilles at 36. This rotation continues until, at the end of a predetermined time the kick-out 30 is released automatically, thereby ejecting the holder through the entrance at 12.

When steak or other meat is broiled in this fashion the continual rotation and the resultant change of position of the sides of the meat causes the meat juices to flow uniformly over the surfaces of the meat with relatively little loss thereof. Such juices as do drip are directed into the drawer at 7 which may be removed at the end of a broiling operation.

The construction which we have devised has been designed primarily for the broiling of meat. As has been indicated however it is not limited to that alone. The invention is available for embodiment in toasters as well as broilers. Such use or any other use to which the construction may be applied is to be comprehended by our invention which is defined in the appended claims, and the invention is not to be limited other than is required by the scope of said claims.

We claim:

1. In combination, a housing having vertical sides, front and back, said front having a vertical entrance opening, vertical spaced heating elements located one adjacent each side of and within the housing, a holder of circular outline having an outside rim and spaced grilles across the open interior of said rim, between which grilles food to be acted upon by heat from the heating elements is adapted to be placed, grooved rollers mounted to turn about horizontal axes mounted within said casing adapted to engage said holder, one at its lowermost point, one to the rear and above said first roller, and one at a front upper portion of the grille, and means for driving one of said rollers.

2. A construction containing the elements defined in claim 1, combined with guide means located substantially horizontally at the lower end of said entrance opening extending in front of the casing and interiorly thereinto, said guide means engaging the sides of the rim of said holder for guiding the holder to said rollers.

3. In combination, a broiling or toasting unit comprising a casing having spaced apart sides and with enclosing top, back and front, said front having an elongated vertical entrance opening, spaced heating elements positioned vertically within said casing one adjacent each side, a roller mounted in the lower portion of the casing between its back and front, said roller having spaced flanges, an annular channel groove therearound an entrance guide located at the lower end of said entrance opening and extending inwardly toward said roller, said guide having a channel form at its lower portion, a spring actuated like roller mounted within the casing adjacent the upper end of said entrance opening and normally depending below said upper end, a third roller of like construction mounted adjacent the back of the casing a short distance above the first mentioned roller, all of said rollers having annular channel grooves between the side flanges thereof, as specified, means for driving one of said rollers.

4. In a structure of the class described, an enclosing housing having spaced vertical sides, a vertical back and front and a top, said front having an elongated vertical entrance opening, a drawer slidably located at the lower end of said housing and adapted to be moved outwardly in a forward direction, spaced vertical heating elements mounted within the casing one adjacent each side thereof, guide means at the upper and lower ends of said front entrance opening adapted to hold and guide a vertically positioned holder having a circular outline into said casing between the heating elements, rollers having grooves to receive the peripheral edge portions of said holder mounted within the housing one at the lower portion thereof, one a short distance back of the upper end of said entrance opening and one adjacent the back and a short distance above the first mentioned roller, and means for driving the lowermost roller.

5. In a construction of the class described, a plurality of units, each including an enclosing casing having an entrance opening at the front and each having spaced apart heating means, means for supporting and rotating a separable circular holder for food material to be acted upon by heat from said heating means including a roller, a shaft on which said roller is fixed, said roller bearing against the periphery of the holder, said shaft extending through all the plurality of units and adapted to be driven whereby each of said rollers in each of said units is simultaneously operated in conjunction with the rollers in other units, a second roller at the rear of the first roller and above it, a third roller movably mounted above and at the front portion of the holder means for movably mounting said third roller, and yielding means for normally pressing the third roller against the holder and acting to press said holder against the other rollers.

6. In a construction as described, an enclosing casing having vertical sides, vertical back and front, the front having an elongated vertical entrance opening, a channel shaped guide at the lower end of said entrance opening and an inverted channel shaped guide at the upper end thereof, a holder of circular form having a rim adapted to traverse said channels and two grilles spaced from each other extending over the openings surrounded by said rim, between which grilles an uncooked food product is adapted to be placed and held, two electric resistance heating units positioned vertically within the casing and spaced apart between which said holder may be located and removed therefrom, and means for turning said holder about a central horizontal axis.

7. A construction containing the elements in combination defined in claim 6, said means for turning said holder comprising a driven roller mounted to turn about a horizontal axis, said roller embracing said rim and engaging against its periphery, and other idle rollers embracing the rim and engaging against its periphery at points spaced from the first mentioned roller and from each other.

ERNEST H. HANSON.
ANDREW GRIERSON.
RUSSELL LEO LE BOEUF.